W. LEWIS.
MOLDING MACHINE.
APPLICATION FILED JULY 8, 1914.
1,157,405.
Patented Oct. 19, 1915.
2 SHEETS—SHEET 1.
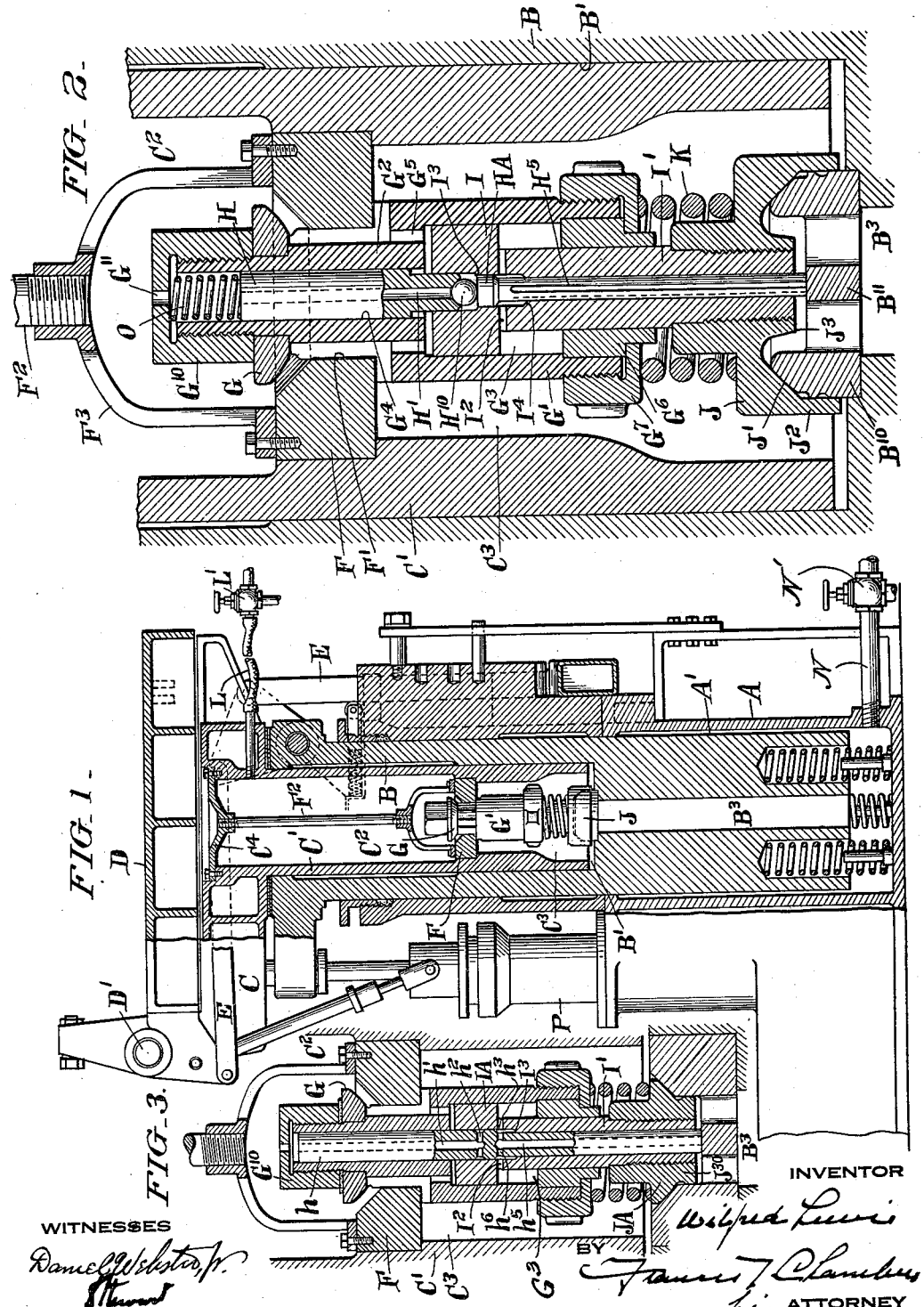

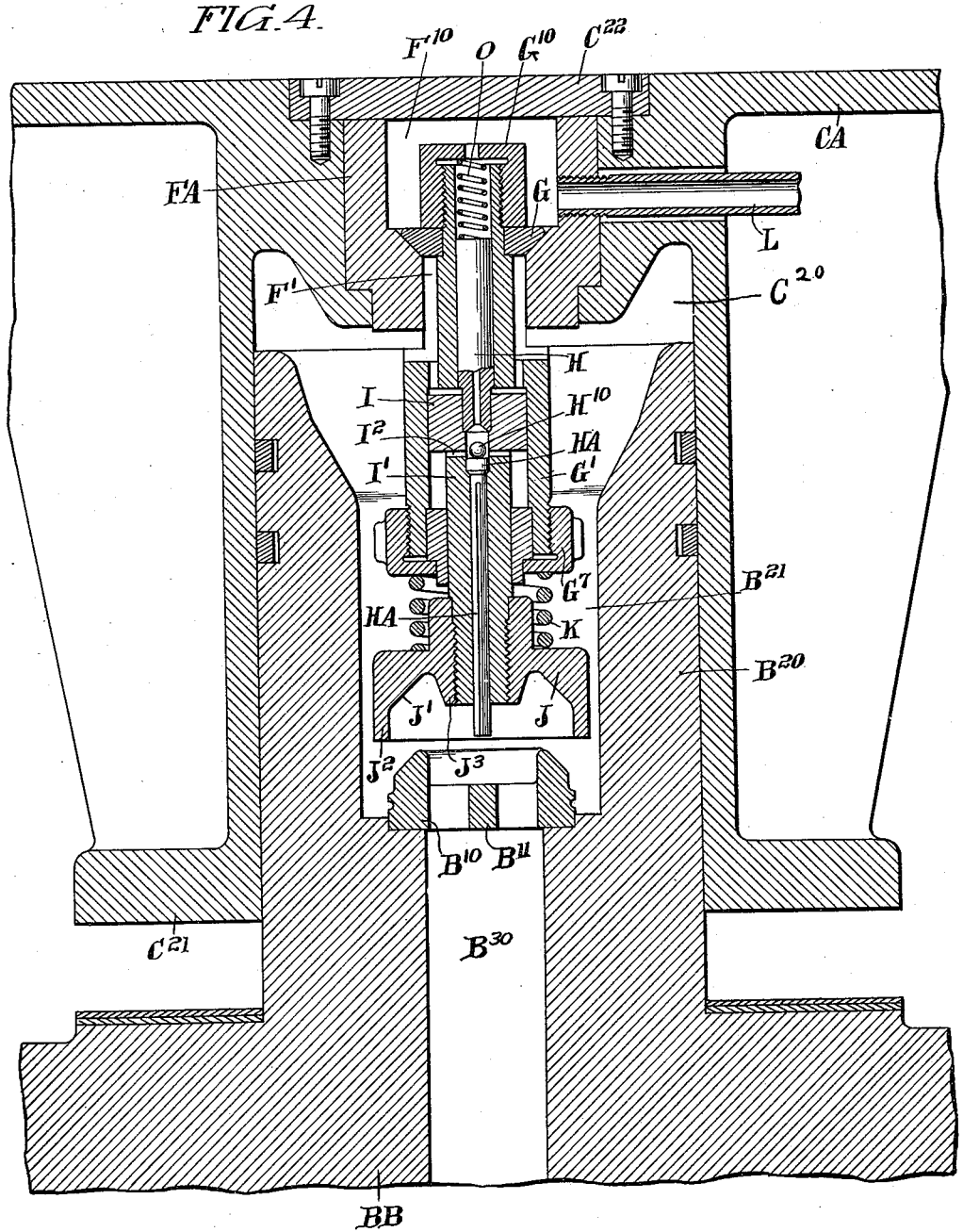

UNITED STATES PATENT OFFICE.

WILFRED LEWIS, OF HAVERFORD, PENNSYLVANIA, ASSIGNOR TO THE TABOR MANUFACTURING COMPANY, OF PHILADELPHIA, PENNSYLVANIA, A CORPORATION OF PENNSYLVANIA.

MOLDING-MACHINE.

1,157,405. Specification of Letters Patent. Patented Oct. 19, 1915.

Application filed July 8, 1914. Serial No. 849,641.

*To all whom it may concern:*

Be it known that I, WILFRED LEWIS, a citizen of the United States, residing in Haverford, in the county of Montgomery and State of Pennsylvania, have invented certain new and useful Improvements in Molding-Machines, of which the following is a true and exact description, reference being had to the accompanying drawings, which form a part thereof.

My present invention relates to molding machines, of the type in which the mold forming material is compacted about the patterns by lifting a mold support or table on which the flask, pattern and mold forming material are supported, above, and then allowing the support or table to fall back into collision with an anvil; and in which fluid pressure means are employed for lifting the mold support above the anvil.

The object of my invention is to provide improvements in the construction, location and arrangement of the valve mechanism employed in bringing about the operation of the fluid pressure mechanism in such a machine.

Considered in one of its aspects, my invention consists in the provisions made for introducing the pressure fluid into the cylinder of the piston and cylinder connection between the anvil and mold support through the latter, and for exhausting the pressure fluid through the anvil.

My invention also consists in a novel form of valve mechanism especially adapted for use in a machine in which the pressure fluid is thus introduced through the mold support.

The various features of novelty characterizing my invention are pointed out with particularity in the claims annexed to and forming a part of this specification. For a better understanding of the invention, however, and of the advantages possessed by it, reference should be had to the accompanying drawings and descriptive matter, in which I have illustrated and described forms in which my invention may be embodied.

Of the drawings: Figure 1 is an elevation, partly in section, of a shockless jar molding machine embodying one form of my present invention; Fig. 2 is a sectional elevation taken on a larger scale than Fig. 1, and showing the valve mechanism of the machine illustrated in Fig. 1; Fig. 3 is a view taken similarly to Fig. 2, illustrating a modified form of valve mechanism; and Fig. 4 is a sectional elevation of a portion of a molding machine illustrating the use of the valve mechanism shown in Fig. 2 in a different form of molding machine.

The molding machine shown in part in Fig. 1, comprises a stationary base A, formed with a cylinder space A′ receiving the vertically movable floating anvil B, which is formed in turn with a cylinder chamber B′ receiving the piston C′ of the mold support member C of the machine. During the jarring operation, the mold does not rest directly upon the member C, in the particular machine shown in Fig. 1, but on a rock over table D, which is pivotally connected to the member C; D′ representing the shaft of the pivotal connection. In the jarring operation, pressure fluid is alternately admitted to and exhausted from the portion of the cylinder space B′ below the piston C′, and in the mold inverting or rocking over operation and pattern drawing operation, pressure fluid is admitted to and exhausted from the space A′ in the base A beneath the member B, the relatively large cross section of the anvil being thus utilized to obtain the requisite power to roll the mold over and to draw the pattern. In the machine shown, the rocking over is effected in part by means of the links and levers E, and a separate fluid pressure motor P is also provided to assist in the roll over and pattern drawing operations.

No claims are made herein on the features of the machine shown in Fig. 1, to which reference has already been made, as the many novel features in the general construction of this machine are claimed in my application Serial No. 811,131, filed January 9th, 1914.

My present invention, in the embodiment illustrated in the drawings, has to do with the construction, arrangement and location of the valve mechanism directly controlling the pressure maintained in the lower end of the chamber B'. In the machine shown in Figs. 1 and 2, the piston C' of the mold supporting member C is made hollow, and is divided into an upper chamber $C^2$ and a lower chamber $C^3$ by the ported valve seat member F. The chamber $C^2$ serves as a portion of the conduit by which compressed air or other fluid under pressure is supplied to the machine to bring about the jar molding operation. As shown in Fig. 1, a flexible pipe L is connected to the upper end of the chamber $C^2$, and this pipe may be connected, as by the three-way valve L', either to the atmosphere, or to a source of pressure fluid. Communication between the chambers $C^2$ and $C^3$ is controlled by a valve G, which, as shown, is in the form of a valve disk or washer, secured by the threaded cap $G^{10}$ to a member G'. The member G' is formed with a fluted valve stem portion $G^2$ which extends through the port F' in the member F, and forms a guide loosely centering the valve mechanism. The member G' is hollow and is formed with a lower central bore $G^3$, and an upper communicating bore $G^4$ of smaller diameter. Working in the enlarged space $G^3$ is a hollow piston I, having a hollow stem I', which projects through the closure for the lower end of the space $G^3$ formed by the washer $G^6$ and the screw cap $G^7$. The lower end of the stem I' carries the valve J, controlling the exhaust from the cylinder space B'. As shown, the valve J is in the form of an annulus, screwed onto the lower end of the stem I'. The valve member J is adapted to engage the seat provided for the purpose on the ported valve seat member $B^{10}$ forming a portion of the lower end wall of the chamber B', and communicating through the channel $B^3$ formed in the member B with the cylinder space A' beneath the floating anvil B. A spring K interposed between the lower end of the member G' and the valve member J tends to spread these members apart at all times. The upper end of the chamber $G^3$ in the member G' is at all times in communication with the chamber $C^3$ through the ports $G^5$.

Working in the axial passage $G^4$ in the member G', and in the alined central passage or passages through the hollow piston I and its stem I', is a compound pilot valve, made up of relatively movable alined plungers H and HA and $H^{10}$. The ball $H^{10}$ normally spaces the members H and HA apart, and normally closes the lower end of an axial passage H' formed in the plunger H. The passage H' communicates through a port $G^{11}$ in the cap member $G^{10}$ with the chamber $C^2$ at all times. The axial passage through the piston I and stem I' is formed in three sections of different diameters. At the bottom of the upper and larger section is an annular valve seat $I^3$, and at the bottom of the intermediate section is a valve seat $I^4$. The member H forms a valve adapted to seat under certain conditions against the annular seat $I^3$. The enlarged upper end of the member HA engages the seat $I^4$ under certain conditions. The stem portion $H^5$ of the member HA is fluted. In the condition of the apparatus shown in the drawings, in which the plunger HA is held in an elevated position relative to the piston I by means of the stop $B^{11}$ carried by the valve seat member $B^{10}$, the channels in the fluted stem $H^5$ at the periphery of the latter, and the ports $I^2$ in the piston stem I' connect the exhaust passage $B^3$ and chamber A' with the portion of the chamber $G^3$ beneath the piston I. When the plungers H and HA are permitted to descend, as hereinafter described, until the plunger H engages the seat $I^3$, and the plunger HA engages the seat $I^4$, the ports $I^2$ establish communication between the lower portion of the chamber $G^3$ and the chamber $C^2$, for at this time the top of the member HA is below the ports $I^2$ and at such a distance below the lower end of the plunger H that the ball $H^{10}$ does not obstruct the flow of fluid through the channel H'. A spring O acts against the upper end of the plunger H, tending at all times to depress the latter.

In Figs. 1, 2 and 3 of the drawings the apparatus is shown in the condition in which the mold supporting member C is resting on the anvil. In this condition of the apparatus when the valve member L' is shifted to admit pressure fluid to the chamber $C^2$, this pressure fluid can pass freely through the port F' in the member F from the chamber $C^2$ into the chamber $C^3$ to thus cause the piston C' to move upward in the cylinder space B'. During the initial upward movement of the piston C', the valve G is held in its open position by reason of the fact that the pressure within the chamber $G^3$ is less than the pressure within the chamber $C^3$. This same pressure differential also aids in holding the piston I stationary during the initial upward movement of the piston. In the construction shown, the valve J is thus held to its seat during the initial upward movement of the mold supporting member C, by its own weight, by the action of the spring K, and by the unbalanced fluid pressure acting on it.

In the initial upward movement of the piston C' the parts H, HA and $H^{10}$ of the pilot valve are held stationary in the position shown, by the weight of the parts, by the action of the spring O, and by the fluid pressure in the chamber $C^2$ acting against the upper end of the member H. As the upward movement of the member C continues, the washer $G^6$ engages the under side of the piston I, whereupon further upward movement of the member G′ is arrested until the valve G engages its seat, after which the valve G and member G′ again share in the further upward movement of the member C. Such further upward movement of the member C lifts the piston I and valve J, and eventually opens the lower end of the chamber B′ to exhaust. Advantageously, the valve member J is so formed that there will be no substantial opening of the chamber B′ to exhaust until the plungers H and HA engage the seats $I^3$ and $I^4$ respectively, and the under side of the piston I is subjected to the supply pressure in the chamber $C^2$. When arranged as just described, the initial reduction in pressure in the chamber $C^3$ following the initial opening of the exhaust passage, results in a quick and wide opening movement of the valve member J by the action of the supply pressure against the under side of the piston I. It will be understood that the tension of the spring K is non-existent, or relatively low, at the time the upward movement of the piston I in the chamber $G^3$ is thus brought about.

In the particular construction of the valve J illustrated, the provisions made for preventing the chamber B′ from being freely opened to exhaust on the initial upward movement of the valve member J, comprises coöperating piston and cylinder parts formed on the valve member J and valve seat member $B^{10}$. As illustrated in the drawing, the valve J is formed with a cylindrical portion $J^2$ below the seat engaging surface $J'$. This cylindrical portion snugly surrounds the valve seat member $B^{10}$, which is cylindrical. The upper edge of the valve seat member $B^{10}$ is rounded, and the valve member is provided with a central boss $J^3$ on its under side, with the result that when the lower edge of the cylindrical portion $J^2$ is finally lifted above the cylindrical outer surface of the valve seat member and the discharge to exhaust begins, the escaping fluid exerts a lifting force against the valve J tending to move the latter upward, and not a suction effect on the valve tending to reseat the latter. After the exhaust from the chamber B′ is thus opened wide, the mold supporting member C begins to fall, and when this movement is arrested by the collision of the member C and the anvil B, the valve parts are restored to their initial position shown in Fig. 2, and the cycle of operation described is continuously repeated, until the valve L′ is shifted to disconnect the chamber $C^2$ from the source of fluid pressure.

It will be understood that during the jarring operation, the valve N′, in the pipe N leading from the lower end of the space A′, is shifted to connect this space to the atmosphere. When the valve N′ is shifted to admit pressure fluid to the lower end of the chamber A′ to lift the floating anvil, for the purpose of squeezing the mold, or in the particular machine shown for the purpose of rolling the mold over, and drawing the patterns, the valve J is held against its seat by the spring K, which should be strong enough to overbalance the action of the fluid pressure then acting on the under side of the valve. At this time the pressure within the chamber $G^3$ will be equal to the pressure in the chamber A′, but this will not affect the apparatus in any way.

The spring O should be strong enough to hold the various pilot valve parts H, $H^{10}$ and HA in the position shown in Fig. 2, when pressure fluid is introduced into the space A′ to lift the anvil B. With the parts of the pilot valve thus held in place, the ball valve $H^{10}$ will prevent pressure fluid leaking upward past the member HA from escaping through the passage H′. In consequence, such leakage must also leak for some distance through the joint between the lower end of the plunger H and the chamber in the piston I in which it works, before escaping from the valve mechanism. Under these circumstances, the upper end of the plunger HA and the lower end of the plunger H need not fit with especial snugness in the chambers in which they work to keep the leakage past them so small as to be quite unimportant. It is primarily to avoid the necessity for close fitting, elongated, cylindrical surfaces in the pilot valve, that I have formed the pilot valve in the separate parts H, $H^{10}$ and HA, for with the parts in the position shown in Fig. 2, leakage in either direction from the chamber $C^3$ into the exhaust port through the valve mechanism must pass successively through the joints between the lower end of the plunger H and the wall surrounding it, and between the upper end of the plunger HA and the wall surrounding it, for the passage H′ is effectually sealed by the ball valve $H^{10}$. During the final portion of the upward movement of the mold support, and during the major portion of the downward movement of the mold support, appreciable leakage is positively prevented by the engagement of the plungers H and HA with the valve seats $I^3$ and $I^4$ respectively.

It is, of course, not absolutely essential to subdivide the pilot valve as shown; and in Fig. 3 I have illustrated a construction differing from that shown in Fig. 2 in that the pilot valve $h$ is a one piece plunger having an upper portion of larger diameter and a lower portion of smaller diameter. The plunger $h$ is formed in its upper portion with an axial channel $h'$ which communicates with the chamber $G^3$ through the ports $h^2$ formed in the pilot valve, and the ports $I^2$ formed in the piston IA, under the same conditions in which the channel H' of the valve construction shown in Fig. 2 communicates with the chamber $G^3$. The plunger $h$ is formed with an axial channel $h^5$ in its lower portion which communicates through lateral ports $h^6$ in the plunger with the ports $I^2$ and chamber $G^3$, under the same conditions in which communication with the exhaust passage is had from the chamber $G^3$ along the fluted stem of the valve shown in Fig. 2. In the valve construction shown in Fig. 3, the spring O is omitted, and the plunger $h$ engages the cap $G^{10}$ when pressure is introduced below the anvil to raise the latter. The plunger $h$ is provided with a valve seat engaging portion $h^3$, which engages the seat $I^3$ under the same conditions in which the plunger HA engages the seat $I^3$ of the construction shown in Fig. 2. In the construction shown in Fig. 3, however, the passage $h'$ is never positively sealed, as it is in the construction shown in Fig. 2, under some conditions by the ball valve $H^{10}$ and under other conditions by the engagement of the lower end of the plunger H with the seat $I^3$. The pilot valve construction shown in Fig. 3 is somewhat simpler than that shown in Fig. 2, but requires a closer fitting of the parts to prevent undesirable leakage.

No provisions are made for causing the escaping fluid to exert a lifting action on the exhaust valve JA of Fig. 3, but this valve is provided with central piston-like extension $J^{30}$ which prevents the chamber B' from being freely opened to exhaust prior to the desired upward movement of the valve JA.

In the apparatus shown in the drawings, the ported valve seat member F is removably secured in place by means of the stem $F^2$ and stirrup $F^3$ and the head $C^4$ removably closing the upper end of the cylinder space $C^2$. By removing the bolts normally securing the head $C^4$ in place, the entire valve mechanism located within the piston C' may be removed by means of the stem F'.

It will, of course, be understood that instead of utilizing the chamber $C^2$ in the mold support piston as the inlet chamber of the supply valve, as in the construction illustrated, the valve seat member F might form a part of a supply valve casing removably mounted within the chamber $C^2$, and this feature of construction is illustrated in my prior application, Serial No. 811,131, referred to above. It will also be apparent, of course, that the means shown herein for regulating the opening and closing of the supply port F', might be employed along with independent means for opening and closing the main exhaust from the chamber B', and such an arrangement is also disclosed in my prior application Ser. No. 811,131. The supply valve operating mechanism of said prior application, while differing in some respects from the supply valve operating mechanism shown herein, embodies various novel features disclosed in this application, which contains the claims on the novel features of valve construction disclosed in common by the two applications.

While in the preferred form of valve mechanism illustrated herein, I employ springs K and O, it is to be observed that the tension of neither of these springs really has anything to do with the normal operation or timing of the valve mechanism. These springs are not relied upon to move the valve parts against pressures opposing such movements in normal operation. On the contrary, the valve mechanism is operated by fluid pressure means, and a change in the supply pressure for instance does not tend to alter the timing or mode of operation of the valve.

In Fig. 4 I have shown the use of a form of valve mechanism, essentially the same as that shown in Fig. 2, in a molding machine in which the anvil BB is formed on its upper side with the piston $B^{20}$ which works in the cylinder $C^{20}$, formed on the under side of the mold support CA and terminating at its lower end in the anvil engaging or striking shoulder $C^{21}$. The valve seat member FA, replacing the valve seat member F of Fig. 2, is shaped to form a supply port F', with a valve seat surrounding its upper end, and also to provide a valve chamber $F^{10}$ in which works the upper portion of the valve mechanism, i. e., the valve G proper and cap $G^{10}$, which may be, and is shown as being, identical with that shown in Fig. 2. The upper end of the chamber $F^{10}$ is closed, and the valve seat member FA clamped against its seat in the mold support CA by a plate $C^{22}$ bolted to the support CA and closing the upper end of the chamber formed in the latter to receive the valve seat member FA. As shown, the upper end of the piston $B^{20}$ is formed with a chamber $B^{21}$ receiving the lower portion of the valve mechanism, and the exhaust outlet $B^{30}$ leads downward from the lower end of the chamber $B^{21}$.

The operation of the apparatus shown in Fig. 4 will be understood without further explanation. In Fig. 4, the valve mechanism is shown with the parts in the positions occupied by them immediately after the piston I has been raised by the introduction of the supply pressure into the chamber $G^3$, to thereby move the exhaust valve J into the wide open position.

Having now described my invention, what I claim as new and desire to secure by Letters Patent, is:

1. In a jar molding machine, the combination with an anvil and mold support formed one with a piston and the other with a cylinder in which said piston works, said mold support being formed with a chamber and a supply port opening therefrom to the interior of said cylinder, of means for supplying pressure fluid to said chamber and a valve mechanism comprising parts engaging said anvil and support and thereby actuated by the relative movements of said anvil and support for opening and closing said port.

2. In a jar molding machine, the combination with an anvil and mold support formed one with a piston and the other with a cylinder in which said piston works, said mold support being formed with a chamber and a supply port opening therefrom to the interior of said cylinder, of means for supplying pressure fluid to said chamber and a valve mounted in said mold support and controlling said port and having a depending stem engaging the anvil and holding said valve open when the mold support is in its lower positions.

3. In a jar molding machine, the combination with an anvil and mold support formed one with a piston and the other with a cylinder in which said piston works, said mold support being formed with a chamber and a supply port opening therefrom to the interior of said cylinder, of means for supplying pressure fluid to said chamber and a valve member mounted in said mold support and controlling said port and having a depending stem of adjustable length adapted when contracted in length to engage the anvil and hold said valve open when the mold support is in its lowermost position, and provisions for elongating said stem during an initial upward movement of the piston to maintain said engagement and keep the valve open.

4. In a jar molding machine, the combination with an anvil and mold support formed one with a piston and the other with a cylinder in which said piston works, said mold support being formed with a chamber and a supply port opening therefrom to the interior of said cylinder, of means for supplying pressure fluid to said chamber, and a valve member mounted in said mold support and controlling said port and having a depending stem comprising coöperating piston and cylinder elements whereby the length of said stem may be varied, said stem when contracted in length engaging the anvil and holding said valve open when the mold support is in its lowermost position, and provisions for maintaining pressures at the opposite sides of said piston element to effect an elongation of said stem sufficient to maintain its engagement with the anvil and thereby to keep said valve open on an initial movement of the mold support.

5. In a jar molding machine, the combination with the anvil and molding supporting parts one of which is provided with a port, of a valve member controlling said port and having a valve stem extending into engagement with the other part and comprising a piston and cylinder and means for subjecting one side of the piston first to the pressure at one side, and then to the pressure at the other side of said port to automatically vary the length of said stem.

6. In a jar molding machine, the combination with an anvil and mold support formed one with a piston and the other with a cylinder in which said piston works, said mold support being formed with a chamber and a supply port opening therefrom to the interior of said cylinder, of means for supplying pressure fluid to said chamber, and a valve member mounted in said mold support and controlling said port and having a depending stem comprising coöperating piston and cylinder elements whereby the length of said stem may be adjusted, said stem in its contracted condition engaging the anvil and holding the valve open when said mold support is in its lowermost position, and provisions for subjecting one side of said piston element to the pressure prevailing at the outlet side of said port and for subjecting the other side of said piston to a lower pressure to thereby elongate said stem and maintain its engagement with the anvil and keep the valve open during an initial upward movement of the mold support.

7. In a jar molding machine, the combination with an anvil and mold support formed one with a piston and the other with a cylinder in which said piston works, said mold support being formed with a chamber and a supply port opening therefrom to the interior of said cylinder and said anvil being formed with an exhaust passage leading from said cylinder, of means for supplying pressure fluid to said chamber, a supply valve mounted in said mold support and controlling said supply port and having a depending stem, an exhaust valve carried by said stem which engages the anvil and closes said exhaust port and thereby holds said supply valve open when the mold support is in its lower positions.

8. In a jar molding machine, the combination with an anvil and mold support formed one with a piston and the other with a cylinder in which said piston works, said mold support being formed with a chamber and a supply port opening therefrom to the interior of said cylinder and said anvil being formed with an exhaust passage leading from said cylinder, of means for supplying pressure fluid to said chamber, a supply valve mounted in said mold support and controlling said port and having a depending stem of adjustable length, an exhaust valve controlling said exhaust port carried by said stem, the latter being adapted when contracted in length to engage the anvil and hold said supply valve open and said exhaust valve closed when the mold support is in its lowermost position, and provisions for elongating said stem during an initial upward movement of the piston to keep the supply valve open and the exhaust valve closed, and for subsequently contracting said stem.

9. In a jar molding machine, the combination with an anvil and mold support formed one with a piston and the other with a cylinder in which said piston works, said mold support being formed with a chamber and a supply port opening therefrom to the interior of said cylinder and said anvil being formed with an exhaust passage leading from said cylinder, of means for supplying pressure fluid to said chamber, and a supply valve mounted in said mold support and controlling said supply port and having a depending stem comprising coöperating piston and cylinder elements whereby the length of said stem may be adjusted, an exhaust valve carried at the lower end of said stem, said stem in its contracted condition engaging the anvil when said mold support is in its lowermost position to thereby close said exhaust port and hold the supply valve open and provisions for subjecting one side of said piston element to the pressure prevailing at the outlet side of said port and for subjecting the other side of said piston to a lower pressure to thereby elongate said stem during an initial upward movement of the mold support.

10. In a jar molding machine, the combination with an anvil and mold support formed one with a piston and the other with a cylinder in which said piston works, said mold support being formed with a chamber and a supply port opening therefrom to the interior of said cylinder and said anvil being formed with an exhaust passage leading from said cylinder, of means for supplying pressure fluid to said chamber, a supply valve mounted in said mold support and controlling said supply port and having a depending stem of adjustable length, an exhaust valve carried by said stem at its lower end which engages the anvil and closes said exhaust port while holding said supply valve open when the mold support is in its lowermost position, and means for increasing the length of said stem during the initial upward movement of the piston to keep the supply valve open and the exhaust valve closed and for thereafter shortening said stem to thereby further open said exhaust valve.

11. In a jar molding machine, the combination with an anvil and mold support formed one with a piston and the other with a cylinder in which said piston works, said mold support being formed with a chamber and a supply port opening therefrom to the interior of said cylinder and said anvil being formed with an exhaust passage leading from said cylinder, of means for supplying pressure fluid to said chamber, and a supply valve mounted in said mold support and controlling said supply port and having a depending stem comprising coöperating piston and cylinder elements whereby the length of said stem may be adjusted, an exhaust valve carried at the lower end of said stem, said stem in its contracted condition engaging the anvil when said mold support is in its lowermost position to thereby close said exhaust port and hold the supply valve open and provisions for continuously subjecting one side of said piston element to the pressure prevailing at the outlet side of said port and for subjecting the other side of said piston to a lower pressure to thereby elongate said stem during an initial upward movement of the mold support and for subsequently subjecting the last mentioned side to the supply pressure to thereby contract the stem.

12. In a jar molding machine, the combination with an anvil and mold support formed one with a piston and the other with a cylinder in which said piston works, said mold support being formed with a chamber and a supply port opening therefrom to the interior of said cylinder and said anvil being formed with an exhaust passage leading from said cylinder, of means for supplying pressure fluid to said chamber and a valve mechanism comprising valves for said ports engaging said anvil and support and thereby actuated by the relative movements of said anvil and support for opening and closing said ports as required to maintain said movements.

13. In a jar molding machine, the combination with an anvil and mold support formed one with a piston and the other with a cylinder in which said piston works, said mold support being formed with a chamber and a supply port opening therefrom to the interior of said cylinder and said anvil being formed with an exhaust passage leading from said cylinder, of means for supplying pressure fluid to said chamber and a valve mechanism for opening and closing said ports, said valve mechanism comprising a supply valve and an exhaust valve at the opposite ends of a connecting stem.

14. In a jar molding machine, the combination with an anvil and mold support formed one with a piston and the other with a cylinder in which said piston works, said mold support being formed with a chamber and a supply port opening therefrom to the interior of said cylinder and said anvil being formed with an exhaust passage leading from said cylinder, of means for supplying pressure fluid to said chamber and a valve mechanism for opening and closing said ports, said valve mechanism comprising a supply valve and an exhaust valve at the opposite ends of a connecting stem adjustable in length and means for automatically adjusting the length of said stem on each reciprocating movement of said piston.

15. In a jar molding machine, the combination with an anvil and mold support formed one with a piston and the other with a cylinder in which said piston works, said mold support being formed with a chamber and a supply port opening therefrom to the interior of said cylinder and said anvil being formed with an exhaust passage leading from said cylinder, of means for supplying pressure fluid to said chamber and a valve mechanism for opening and closing said ports, said valve mechanism comprising a supply valve and an exhaust valve at the opposite ends of a connecting stem adjustable in length and fluid pressure means responsive to pressure differences existing in said machine for automatically adjusting the length of said stem on each reciprocating movement of said piston.

16. In a jar molding machine, the combination with an anvil and mold support formed one with a piston and the other with a cylinder in which said piston works, said mold support being formed with a chamber and a supply port opening therefrom to the interior of said cylinder and said anvil being formed with an exhaust passage leading from said cylinder, of means for supplying pressure fluid to said chamber and a valve mechanism comprising a valve member controlling said supply port, a valve member controlling said exhaust port and a connecting stem comprising coöperating piston and cylinder elements whereby the length of said stem may be varied.

17. In a jar molding machine, the combination with an anvil and mold support formed one with a piston and the other with a cylinder in which said piston works, said mold support being formed with a chamber and a supply port opening therefrom to the interior of said cylinder and said anvil being formed with an exhaust passage leading from said cylinder, of means for supplying pressure fluid to said chamber and a valve mechanism comprising a valve member controlling said supply port, a valve member controlling said exhaust port and a connecting stem comprising relatively movable elements whereby the length of said stem may be varied, and resilient means acting between said piston and the last mentioned valve member for holding the latter seated on an increase in pressure at the outlet side of the exhaust port.

18. In a jar molding machine, the combination with an anvil and mold support formed one with a piston and the other with a cylinder in which said piston works, said mold support being formed with a chamber and a supply port opening therefrom to the interior of said cylinder and said anvil being formed with an exhaust passage leading from said cylinder, of means for supplying pressure fluid to said chamber and a valve mechanism comprising a valve member controlling said supply port, a valve member controlling said exhaust port and a connecting stem comprising coöperating piston and cylinder elements whereby the length of said stem may be varied, and a pilot valve mounted in said valve mechanism and regulating the pressure in one end of said cylinder element.

19. In a jar molding machine, the combination with an anvil and mold support formed one with a piston and the other with a cylinder in which said piston works, said mold support being formed with a chamber and a supply port opening therefrom to the interior of said cylinder and said anvil being formed with an exhaust passage leading from said cylinder, of means for supplying pressure fluid to said chamber and a valve mechanism comprising a valve member controlling said supply port, a valve member controlling said exhaust port and a connecting stem comprising coöperating piston and cylinder elements whereby the length of said stem may be varied, one end of said piston element being exposed to the pressure in the lower end of the anvil cylinder and means for subjecting the other end of said piston element alternately to pressures of different intensity to thereby elongate said stem in one stage of each reciprocating movement of the mold support and to shorten said stem in another portion of said movement.

20. In a jar molding machine, the combination with an anvil and mold support formed one with a piston and the other with a cylinder in which said piston works, said mold support being formed with a chamber and a supply port opening therefrom to the interior of said cylinder and said anvil being formed with an exhaust passage leading from said cylinder, of means for supplying pressure fluid to said chamber and a valve mechanism comprising a valve member controlling said supply port, a valve member controlling said exhaust port and a connecting stem comprising coöperating piston and cylinder elements whereby the length of said stem may be varied, one end of said piston element being subjected to the pressure in the lower end of said anvil cylinder and means for alternately subjecting the other end of said piston element to the pressure on the outlet side of said exhaust port and to the pressure on the inlet side of said supply port.

21. In a jar molding machine, the combination with an anvil and mold support formed one with a piston and the other with a cylinder in which said piston works, said mold support being formed with a chamber and a supply port opening therefrom to the interior of said cylinder and said anvil being formed with an exhaust passage leading from said cylinder, of means for supplying pressure fluid to said chamber and a valve mechanism comprising a valve member controlling said supply port, a valve member controlling said exhaust port and a connecting stem comprising coöperating piston and cylinder elements whereby the length of said stem may be varied, and a pilot valve mounted in said valve mechanism and regulating the pressure in one end of said cylinder element.

22. In a jar molding machine, the combination with an anvil and mold support formed one with a piston and the other with a cylinder in which said piston works, said mold support being formed with a chamber and a supply port opening therefrom to the interior of said cylinder and said anvil being formed with an exhaust passage leading from said cylinder, of means for supplying pressure fluid to said chamber and a valve mechanism comprising a valve member controlling said supply port, a valve member controlling said exhaust port and a connecting stem comprising coöperating piston and cylinder elements whereby the length of said stem may be varied, each valve and its stem portion being formed with a passage, said passages communicating at their inner ends with one another and with said chamber and opening at their opposite ends at opposite sides of the two valves, and a pilot valve working in said passages and controlling communication with said chamber through said passages.

23. In a jar molding machine, the combination with an anvil and mold support formed one with a piston and the other with a cylinder in which said piston works, said mold support being formed with a chamber and a supply port opening therefrom to the interior of said cylinder and said anvil being formed with an exhaust passage leading from said cylinder, of means for supplying pressure fluid to said chamber and a valve mechanism comprising a valve member controlling said supply port, a valve member controlling said exhaust port and a connecting stem comprising coöperating piston and cylinder elements whereby the length of said stem may be varied, each valve and its stem portion being formed with a passage, said passages communicating at their inner ends with one another and with said chamber and opening at their opposite ends at opposite sides of the two valves, and a pilot valve working in said passages and controlling communication with said chamber through said passages said pilot valve being formed in relatively movable sections.

24. In a jar molding machine, the combination with an anvil and mold support formed one with a piston and the other with a cylinder in which said piston works, said mold support being formed with a chamber and a supply port opening therefrom to the interior of said cylinder and said anvil being formed with an exhaust passage leading from said cylinder, of means for supplying pressure fluid to said chamber and a valve mechanism mounted in said mold support and comprising a valve member controlling said supply port, a valve member controlling said exhaust port and a connecting stem comprising a stem portion formed with a piston chamber and a stem portion formed with a piston working in said chamber whereby the length of said stem may be varied, said valves and stem portions being formed with alined passages communicating at their inner ends with one another and with said chamber and opening at their opposite ends at opposite sides of the two valves, and a pilot valve controlling communication with said piston chamber through said passages, said valve mechanism including provisions whereby said pilot valve is urged toward said anvil, said pilot valve engaging the mold support and being thereby adjusted relative to said valves as the mold support moves into its lowermost position.

25. In a jar molding machine, the combination with an anvil and mold support formed one with a piston and the other with a cylinder in which said piston works, said mold support being formed with a chamber and a supply port opening therefrom to the interior of said cylinder and said anvil being formed with an exhaust passage leading from said cylinder, of means for supplying pressure fluid to said chamber and a valve mechanism comprising a valve member controlling said supply port, a valve member controlling said exhaust port and a connecting stem comprising coöperating piston and cylinder elements whereby the length of said stem may be varied, said valves and their stem portions being formed with passages communicating at their inner ends with one another and with said chamber and opening at their opposite ends at opposite sides of the two valves and a pilot valve working in said passages and adapted to close one of said passages and open the other in one position and in a second position to open the previously closed passage and close the previously open passage.

26. In a jar molding machine, the combination with an anvil and mold support formed one with a piston and the other with a cylinder in which said piston works, said mold support being formed with a chamber and a supply port opening therefrom to the interior of said cylinder and said anvil being formed with an exhaust passage leading from said cylinder, of means for supplying pressure fluid to said chamber and a valve mechanism comprising a valve member controlling said supply port, a valve member controlling said exhaust port and a connecting stem comprising coöperating piston and cylinder elements whereby the length of said stem may be varied, said valves and their stem portions being formed with passages communicating at their inner ends with one another and with said chamber and opening at their opposite ends at opposite sides of the two valves and a pilot valve working in said passages and comprising two plungers and an intermediate member, said pilot valve being movable from one position in which said intermediate member spaces the two plungers apart and coacts with one of them to close one of said passages while the other is open into a second position in which said other plunger closes said other passage and no longer holds the intermediate member against the other plunger and the previously closed passage is open.

27. In a jar molding machine, the combination with an anvil and mold support formed one with a piston and the other with a cylinder in which said piston works, said mold support being formed with a chamber and a supply port opening therefrom to the interior of said cylinder and said anvil being formed with an exhaust passage leading from said cylinder, of means for supplying pressure fluid to said chamber and a valve mechanism comprising a valve member controlling said supply port, a valve member controlling said exhaust port and a connecting stem comprising coöperating piston and cylinder elements whereby the length of said stem may be varied, said valves and their stem portions being formed with passages communicating at their inner ends with one another and with said chamber and opening at their opposite ends at opposite sides of the two valves and a pilot valve working in said passages and comprising two plungers and an intermediate member, said pilot valve being movable from one position in which said intermediate member spaces the two plungers apart and coacts with one of them to close one of said passages while the other is open into a second position in which said other plunger closes said other passage and no longer holds the intermediate member against the other plunger and the previously closed passage is open, each of said plungers being provided with an annular valve portion adapted to seat against annular valve seats formed by annular portions of the walls of said passages.

28. In a jar molding machine, the combination with mold support and anvil members formed one with a piston and the other with a cylinder in which the piston works and having an exhaust outlet from said cylinder formed in one of said members, of mechanism controlling the admission to and exhaust from said cylinder of a pressure fluid to effect alternate movements of separation and approach of said members, including a valve controlling said outlet and having a stem adjustable in length connecting it to the other of said members, and means for elongating said stem during the initial portion of each movement of separation and thereafter shortening said stem.

29. In a jar molding machine, the combination with mold support and anvil members formed one with a piston and the other with a cylinder in which the piston works and having an exhaust outlet from said cylinder formed in one of said members, of mechanism controlling the admission to and exhaust from said cylinder of a pressure fluid to effect alternate movements of separation and approach of said members, including a valve controlling said outlet and having a stem adjustable in length connecting it to the other of said members, said valve and the portion adjacent the outlet of the member in which the outlet is formed being shaped to cause the escaping fluid to act kinetically on the valve when the outlet is open in a direction tending to keep the outlet open.

30. In a jar molding machine, the combination with mold support and anvil members formed one with a piston and the other with a cylinder in which the piston works and having an exhaust outlet from said cylinder formed in one of said members, of mechanism controlling the admission to and exhaust from said cylinder of a pressure fluid to effect alternate movements of separation and approach of said members, including a valve controlling said outlet and having a stem connecting it to the other of said members, said valve and the portion adjacent the outlet of the member in which the outlet is formed being shaped to provide telescoping portions whereby said outlet is not freely opened until after an initial movement of the valve relative to the outlet has occurred.

31. In a jar molding machine the combination with mold support and anvil members formed one with a piston and the other with a cylinder in which the piston works and having an inlet port to said cylinder formed in one of said members and an exhaust outlet from said cylinder formed in the other of said members, of mechanism controlling the admission to and exhaust from said cylinders of a pressure fluid to effect alternate movements of separation and approach of said members, said mechanism including relatively movable valves controlling said ports and connected to one another by a stem adjustable in length, and means for varying the length of said stem in one direction during the initial portion of each movement of separation and for thereafter varying the length of said stem in the opposite direction.

WILFRED LEWIS.

Witnesses:
ARNOLD KATZ,
D. STEWART.

Copies of this patent may be obtained for five cents each, by addressing the "Commissioner of Patents, Washington, D. C."